(12) United States Patent
Watson

(10) Patent No.: US 6,223,209 B1
(45) Date of Patent: Apr. 24, 2001

(54) DISTRIBUTED WORLD WIDE WEB SERVERS

(75) Inventor: Gary E. Watson, Dayton, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/940,701

(22) Filed: Sep. 30, 1997

(51) Int. Cl.⁷ .................................................. G06F 15/16
(52) U.S. Cl. .......................................... 709/201; 709/229
(58) Field of Search ....................... 395/200.47, 200.48, 395/200.45, 200.43, 200.46, 200.69, 601, 615; 707/104, 10; 709/224, 219, 226, 227, 217, 223, 229, 201, 203; 320/393; 701/207; 382/306

(56) References Cited

U.S. PATENT DOCUMENTS

| | | | |
|---|---|---|---|
| 5,434,994 | * 7/1995 | Shaheen et al. ...................... 709/223 |
| 5,495,607 | 2/1996 | Pisello et al. ......................... 395/600 |
| 5,550,577 | 8/1996 | Verbiest et al. ........................... 348/7 |
| 5,553,239 | 9/1996 | Heath et al. ..................... 395/187.01 |
| 5,555,404 | 9/1996 | Torbjornsen et al. ............... 395/600 |
| 5,561,769 | 10/1996 | Kumar et al. .................... 395/200.05 |
| 5,586,310 | 12/1996 | Sharman ............................... 395/600 |
| 5,682,478 | * 10/1997 | Watson et al. ....................... 709/229 |
| 5,737,495 | * 4/1998 | Adams et al. ........................ 395/615 |
| 5,742,598 | * 4/1998 | Dunn et al. ........................... 370/393 |
| 5,751,961 | * 5/1998 | Smyk ................................ 395/200.47 |
| 5,774,660 | * 6/1998 | Brendel et al. ................. 395/200.31 |
| 5,778,368 | * 7/1998 | Hogan et al. ........................... 707/10 |
| 5,812,784 | * 9/1998 | Watson et al. ....................... 709/227 |
| 5,828,876 | * 10/1998 | Fish et al. ............................. 395/601 |
| 5,850,490 | * 12/1998 | Johnson ................................ 382/306 |
| 5,852,717 | * 12/1998 | Bhide et al. .................... 395/200.33 |
| 5,884,038 | * 3/1999 | Kapoor ................................... 395/56 |
| 5,919,247 | * 7/1999 | Van Hoff et al. .................... 709/217 |
| 5,928,306 | * 7/1999 | France et al. ......................... 701/207 |
| 5,933,835 | * 8/1999 | Adams et al. ........................ 707/104 |
| 6,112,239 | * 8/2000 | Kenner et al. ........................ 709/224 |

OTHER PUBLICATIONS

Law et al., "A scalable and distributed WWW proxy system", IEEE No. 5644122, Jun. 1997.*
Jeffery et al., "Proxy-sharing proxy servers," IEEE No. 5335260, May 1996.*
Wu et al., "Virtual proxy servers for WWW and intelligent agents on the Internet," Jan. 1997.*
unknown auther, "TUCOWS:The Ultimate Collection of Winsock Software," http://nersp.nerdc.utl.edu/info-services/tucows.html, last modified Jan. 1996 according to altavista, Mar. 1999.*
Selected results of altavista search of Internet documents before Sep. 1997, keywords mirror and site, Mar. 25, 1999.*

* cited by examiner

Primary Examiner—Robert B. Harrell
Assistant Examiner—Thong Vu
(74) Attorney, Agent, or Firm—James M. Stover

(57) ABSTRACT

A method for providing information stored on a primary network server to clients linked to the server through a distributed hypertext Internet or intranet network wherein stored information is contained in hypertext documents or "web" pages. One or more satellite servers, each containing a copy of the information contained in the primary server are placed strategically throughout the network so as all potential clients are close to a server. The primary or "home" server examines the IP address, or Uniform Resource Locator (URL) of a requesting browser client to determine the satellite server closest to the client. The home server then returns a home page to the requesting client which includes embedded links pointing only to the satellite server closest to the requesting client and the copy of information, i.e., duplicate web pages, contained therein.

7 Claims, 2 Drawing Sheets

DISTRIBUTED WORLD WIDE WEB SERVERS

The present invention relates to the distribution of information within a distributed hypertext system such as the World Wide Web and, more particularly, to a method for leveling traffic flow and eliminating traffic bottlenecks within a web network by providing duplicate information at multiple web sites.

BACKGROUND OF THE INVENTION

Recent years have seen an exponential increase in the use and construction of the World Wide Web (WWW) system. A drastic increase in traffic over the web resulting from the addition of web sites and expansion of the user base has resulted in extended response times when documents, graphics or other files are retrieved from remote server sites for viewing at a client site. Reasons for the increase in response times include a lack of network bandwidth and an inability of popular web servers to keep up with client requests. Internet Service Provides (ISPs) and Network Service Providers (NSPs) have been increasing network bandwidth in an attempt to accommodate increased web usage, but new services such as audio and video over the Internet can easily consume any capacity expansion as it is brought online.

Server capacity limits can be improved through the addition of more servers at the same site, but this solution places additional strain on the ISP supplying the Internet feed. A traffic bottleneck will always exist if a substantial number of client requests are directed to one popular site. Therefore, a method for distributing popular web site information throughout the Internet so that a client can obtain desired information from a neighborhood server rather than from a remote web site, thereby avoiding making use of congested Internet pathways is desired.

OBJECTS OF THE INVENTION

It is therefore an object of the present invention to provide a new and useful method for obtaining information over the World Wide Web system.

It is another object of the present invention to provide a new and useful method for leveling traffic flow and eliminating traffic bottlenecks on a distributed hypertext network.

It is yet another object of the present invention to provide such a method wherein information is duplicated at multiple sites within the hypertext network.

SUMMARY OF THE INVENTION

There is provided, in accordance with the present invention, a method for providing information stored on a primary network server to clients linked to the server through a distributed hypertext network. The method comprises the steps of establishing at least one satellite server located at a site remote from the primary server and placing a duplicate of the information on the satellite server. When a client request for information is received by the primary server, the location or address of the requesting client is examined and the request is redirected to the server providing the most convenient information source for the requesting client.

In the described embodiment, the invention is applied to a web based Internet or intranet system wherein the stored information is contained in hypertext documents or "web" pages. The primary or "home" server examines the IP address of a requesting browser client to determine the satellite server closest to the client. The home server then returns a home page to the requesting client which includes embedded links pointing only to the closest satellite server and the copy of information, i.e., duplicate web pages, contained therein. Many satellite servers containing identical information may be placed strategically throughout the Internet so as to be close to all potential clients.

The above and other objects, features, and advantages of the present invention will become apparent from the following description and the attached drawings.

DETAILED DESCRIPTION OF THE PREFERRED EMBODIMENT

Figure 1:
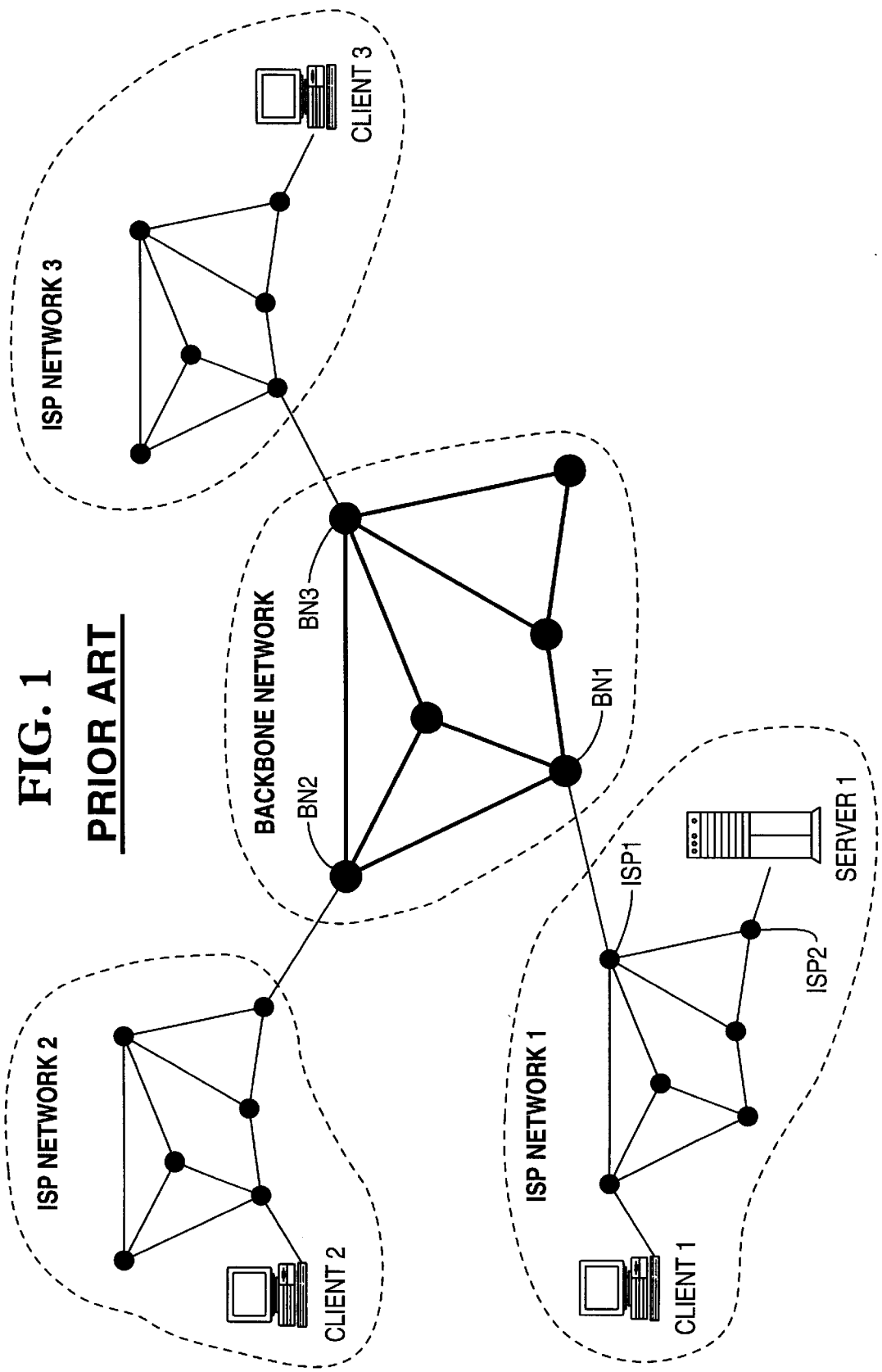
FIG. 1 provides an illustration of a portion of a distributed hypertext (web) network.

Referring now to FIG. 1, there is seen an exemplary representation of a portion of a typical distributed hypertext (web) network. The web network illustrated in FIG. 1, as well as the network shown in FIG. 2 have been greatly simplified for illustrative purposes. Only those network elements believed necessary for an understanding of the present invention are shown in the Figures and described below.

The network includes several Internet Service Provider (ISP) networks, ISP NETWORK 1, ISP NETWORK 2 and ISP NETWORK 3. Each ISP network includes multiple interconnected nodes to which are connected clients, such as CLIENT 1, CLIENT 2 and CLIENT 3, and web servers, such as the web server identified as SERVER 1. The individual ISP networks are each connected to a global backbone network, identified in FIG. 1 as BACKBONE NETWORK. A few of the many ISP network and backbone network nodes are identified with reference numerals BN1, BN2, BN3, ISP1 and ISP2. Nodes BN1, BN2 and BN3 are the connection points between the three ISP networks and the backbone network.

In the system shown in FIG. 1, a client request issued from CLIENT 2 or CLIENT 3 for information residing on SERVER 1, located in ISP NETWORK 1, must funnel through the backbone network and follow the communication path BN1-ISP1-ISP2. This may overload some of the routers (not shown), network links or other network elements along this path, or SERVER 1.

Figure 2:
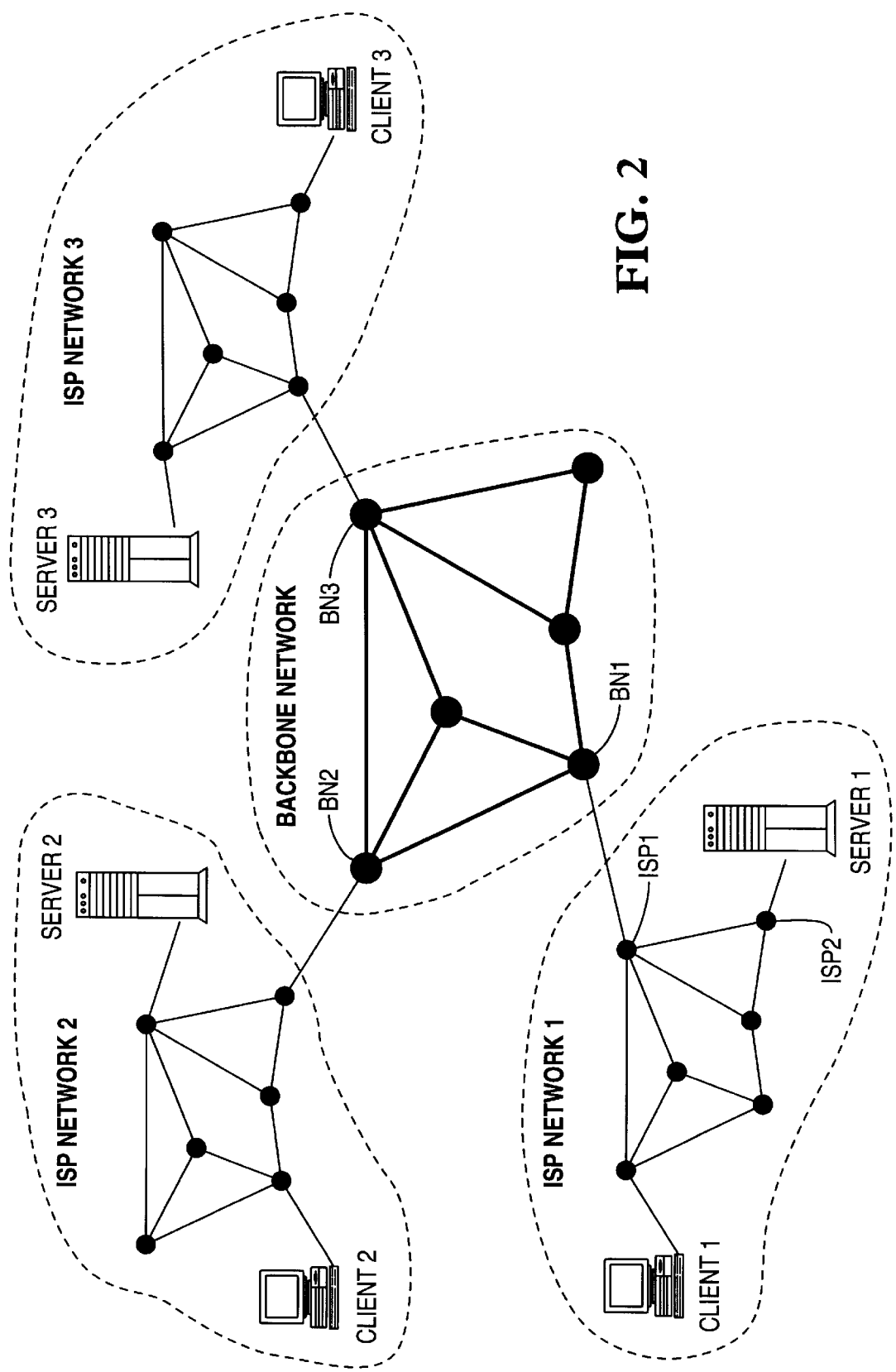
FIG. 2 provides an illustration of a portion of a distributed hypertext (web) network including satellite or mirror server sites distributed strategically throughout the network in accordance with the present invention.

FIG. 2 provides an illustration of a portion of a distributed hypertext (web) network including satellite or mirror server sites distributed strategically throughout the network in accordance with the present invention. The web network shown in FIG. 2 includes all of the elements shown in FIG. 1 and described above, but also includes satellite or mirror servers SERVER 2 and SERVER 3, located in ISP NETWORK 2 and ISP NETWORK 3, respectively.

The present invention provides a method for distributing information across the network, but still letting it be accessed with a single address known as a Uniform Resource Locator (URL). Information from a particular information provider is replicated at many sites, thereby allowing a client to retrieve the information from a relatively local site, reducing traffic on congested main network backbones.

A URL consists of four separate parts, which when combined completely define the location of any file located anywhere on the network. The first is the protocol used for information interchange. The protocol defines the type of server a selected link points to. URL protocols include: file:, ftp:, http: gopher:, mailto:, news:, telnet: and wais:. The Hypertext Transfer Protocol, i.e., http:, is the protocol utilized by WWW servers.

The second URL component is the domain name, which identifies the location of the server containing the file or information which is being requested. The domain name for the NCR Corporation WWW server is www.ncr.com. The location of a server may also be identified through use of its less descriptive IP (Internet Protocol) address rather than its domain name. Usually, a server's home page or root directory can be accessed through use of only a protocol and domain name. For example, the home page of the NCR Corporation WWW server can be retrieved with the following URL: http://www.ncr.com/.

The third and fourth components of a URL, which may or may not exist, are the path and filename of the requested file or information.

In order to retrieve a web page, a web browser takes the page's URL address string and finds its IP address from the nearest Domain Name Server (DNS) using DNS protocols. In the web network shown in FIG. 2, where the information contained in the primary server SERVER 1 has been copied to satellite server sites SERVER 2 and SERVER 3 in order to reduce net backbone traffic and response times, it is necessary to determine which satellite server is closest to a client making a request for information and to then point the client to that satellite server. Although it might be possible to provide this function in the DNS server, to do so would require changes to the already well established standardized DNS system which returns a unique IP address for every domain name submitted. Modifying the DNS system would be a prodigious, error-prone effort, as there are hundreds or thousands of DNS servers and programs which would have to be changed.

The present invention provides a method for redirecting information requests to a satellite server closest to a client making the request, which does not require changes to the DNS system. Satellite server locations are maintained within the primary server. Following receipt of the initial client request by the primary server, a home page containing links pointing to the satellite server closest the requesting client is returned to the client. All subsequent requests are thereafter directed to the satellite server. This method is illustrated in the example which follows.

Consider the situation of the very popular XYZ Corporation server site. XYZ Corporation has a "home" server with the domain address "www.xyz.com" which is freely advertised. It also has satellite servers at key locations around the country where ISPs connect to each other or to major Internet backbone providers such as MCI, Sprint and ANS.

All browser clients connect first to www.xyz.com to retrieve the home page for the XYZ Corporation. The www.xyz.com server obtains the IP address of each client that requests a home page from the client request packets. Using the IP address extracted from the request packet and information provided by the ISPs and NSPs, the XYZ Corporation primary server determines which satellite server is closest to the client, i.e., the satellite server which provides the communication path containing the least number of router hops or the highest bandwidth path. The primary or home server, www.xyz.com, then returns a home page with subsequent links pointing to appropriately selected satellite server, e.g., www.xyz2.com.

Determination of which satellite server is closest to the requesting client can be accomplished through various techniques. One method would be to maintain a table or catalogue of client addresses together with an identification of the primary or satellite server closest to each client entry in the table. Upon receipt of a request from a client, the primary server would then determine the appropriate server to direct the client to through a search through the client/server table.

The satellite server nearest a requesting client can also be determined through the use of a technique similar to the "traceroute" utility common to all UNIX systems, or the equivalent "tracert" utility in Windows 95™ and Windows NT™. Utilizing this technique, the primary server upon receipt of a request from a client, sends a message to each router in the path to the client which causes the router to reply with a message containing the router's IP address and possibly a domain name for the router. The returned router information allows the primary to identify the network which includes the requesting client. If a satellite server also resides on that network, client requests can be redirected to that satellite server.

This process distributes traffic to the XYZ Corporate across disjoint network segments, leveling traffic and web server loads. The home server need only to provide the top level home page, which can be relatively simple to minimize home server traffic. The information contained at the satellite servers sites can be identical if the information hierarchy is in the form of relative links, thereby simplifying the process of mirroring the information on the satellite servers easy.

Referring again to FIG. 2, CLIENT 2 and CLIENT 3 can obtain information from SERVER 2 and SERVER 3, respectively across the corresponding ISP networks without having to traverse the backbone network. CLIENT 1 will get the first page from SERVER 1 over the ISP NETWORK 1, but would receive subsequent web pages from SERVER 2 which is logically closer to it than SERVER 3.

It can thus be seen that there has been provided by the present invention a new and useful method for leveling traffic flow and eliminating traffic bottlenecks on a distributed hypertext network. By providing duplicate information at multiple satellite servers throughout the network, the routes over which data is flowing are shortened and varied, thereby eliminating network bottlenecks and improving response time, performance and reliability.

Although the presently preferred embodiment of the invention has been described, it will be understood that various changes may be made within the scope of the appended claims.

What is claimed is:

1. A method for providing information to clients linked to a distributed network, each client having an address within said network, said method comprising the steps of:

establishing a primary server for the storage of information, said primary server having a first address within said network, said first address being identified to said clients as containing said information;

establishing at least one satellite server located at a site geographically remote from said primary server, said satellite server having a second address within said network;

placing a duplicate of said information on said satellite server;

storing the second address for said satellite server satellite server within said primary server;

reading at said primary server the address of a client issuing a request to said primary server for access to said information;

identifying at said primary server the server closest to said client issuing said request by sending a message from said primary server to each router in the path to said client issuing said request causing each router to reply with a message containing the router's IP address and domain name; and automatically redirecting said client request to said server closest to said client issuing said request.

2. The method in accordance with claim 1, wherein:

said information comprises hypertext markup language (html) documents.

3. A method for providing information to clients linked to a distributed hypertext network, each client having an address within said network, said method comprising the steps of:

establishing a plurality of servers located at multiple geographical sites throughout said hypertext network, each one of said plurality of servers having a unique address within said network;

identifying one of said plurality of servers as a primary server for the storage of hypertext documents, the address of said primary server being identified to said clients as containing said hypertext documents;

placing a duplicate of said hypertext documents on each one of said plurality of servers;

storing a first home page containing embedded links pointing to said hypertext documents contained on said primary server, and an additional home page corresponding to each one of said plurality of satellite servers, each additional home page containing embedded links pointing to the duplicates of said hypertext documents contained on its corresponding satellite server;

associating one of said home pages corresponding to said primary and satellite servers to each client address within said hypertext network;

reading at said primary server the client address of a client issuing a request to said primary server for access to said information; and automatically providing the home page associated with the client address of said client issuing said request to said client issuing said request.

4. A method for providing information to clients linked to a distributed network, each client having an address within said network, said method comprising the steps of:

establishing a primary server for the storage of information, said primary server having a first address within said network, said first address being identified to said clients as containing said information;

establishing at least one satellite server located at a site geographically remote from said primary server, said satellite server having a second address within said network;

placing a duplicate of said information on said satellite server;

storing the second address for said satellite server within said primary server;

storing a catalogue table of client addresses together with an identification of the primary or satellite server closest to each client entry in said table;

reading at said primary server the address of a client issuing a request to said primary server for access to said information;

identifying at said primary server the server closest to said client issuing said request; and automatically redirecting said client request to said satellite server when said client address is included within said catalogue of client addresses.

5. The method in accordance with claim 4, wherein:

the location of said satellite server and the client addresses included within said catalogue of client addresses are selected to reduce traffic bottlenecks between said satellite server and the clients having client addresses included within said catalogue of client addresses.

6. The method in accordance with claim 5, wherein:

said primary server contains a first home page containing embedded links pointing to reference documents contained on said primary server, and a second home page containing embedded links pointing to copies of said reference documents contained on said satellite server; and said step of redirecting said client request to said satellite server when said client address is included within a predetermined catalogue of client addresses comprises the step of providing said second home page to said client issuing said request.

7. The method in accordance with claim 4, wherein:

said information comprises hypertext markup language (html) documents.

* * * * *